(12) United States Patent
Planes et al.

(10) Patent No.: US 8,427,097 B2
(45) Date of Patent: Apr. 23, 2013

(54) HYBRID ELECTRICAL POWER SOURCE

(75) Inventors: Elena Batallier Planes, Gandia (ES); Jesus Angel Oliver Ramirez, Madrid (ES); Oscar Garcia Suarez, Madrid (ES)

(73) Assignee: The Boeing Company, Chicago, IL (US)

( * ) Notice: Subject to any disclaimer, the term of this patent is extended or adjusted under 35 U.S.C. 154(b) by 329 days.

(21) Appl. No.: 12/530,392

(22) PCT Filed: Feb. 25, 2008

(86) PCT No.: PCT/US2008/054830
§ 371 (c)(1),
(2), (4) Date: Sep. 8, 2009

(87) PCT Pub. No.: WO2008/109276
PCT Pub. Date: Sep. 12, 2008

(65) Prior Publication Data
US 2010/0045112 A1    Feb. 25, 2010

(30) Foreign Application Priority Data
Mar. 6, 2007  (EP) .................................. 07380063

(51) Int. Cl.
*H02J 7/00*           (2006.01)
(52) U.S. Cl.
USPC ............... 320/103; 320/101; 307/46; 307/64; 307/66

(58) Field of Classification Search .................. 320/101, 320/103; 307/46, 64, 66
See application file for complete search history.

(56) References Cited

U.S. PATENT DOCUMENTS

| | | | |
|---|---|---|---|
| 4,961,151 A | 10/1990 | Early et al. | |
| 2003/0105562 A1 | 6/2003 | Hsiao et al. | |
| 2006/0240291 A1* | 10/2006 | Kim et al. ........................ | 429/9 |

FOREIGN PATENT DOCUMENTS

| | | |
|---|---|---|
| EP | 1086847 A2 | 3/2001 |
| JP | 10271706 A | 10/1998 |

OTHER PUBLICATIONS

Machine translation of JPA10271706.*

\* cited by examiner

*Primary Examiner* — Samuel Berhanu
(74) *Attorney, Agent, or Firm* — McNees Wallace & Nurick LLC

(57) ABSTRACT

An embodiment of the present invention includes first and second electrical energy sources configured to supply current to an output, and a controller configured to receive a signal indicative of the current being drawn at the output, to compare the output current with a reference current level, and to regulate the voltage provided by the one of the first or second electrical energy sources such that: when the output current is lower than or equal to the reference current level, the first energy source supplies current equal to the output current; and, when the output current exceeds the reference current level, the first energy source supplies current equal to the reference current level and the second energy source supplies the remaining current required by the load.

12 Claims, 4 Drawing Sheets

HYBRID ELECTRICAL POWER SOURCE

FIELD OF THE INVENTION

This invention relates generally to electric power, and more particularly to hybrid electrical power sources having two or more electrical energy sources that supply energy to a connected load, and yet more particularly to a hybrid electrical power source comprising a fuel cell and a battery.

CROSS-REFERENCE TO RELATED APPLICATIONS

This application is a 371 of PCT/U.S. 2008/054830 filed Feb. 25, 2008. This application also claims the benefit of European Patent Application No. 07380063.3, filed Mar. 6, 2007.

As shown in FIG. 1, conventional hybrid electrical power systems may comprise two electrical energy sources connected in parallel to a load, where the electrical energy sources will often have different electrical characteristics. For example, the electrical energy sources may be a fuel cell and a battery. When the fuel cell and battery are connected in parallel across the load, the different electrical characteristics of the fuel cell and battery may result in poorly optimized load sharing.

The battery is essentially a constant voltage source except under circumstances where it is discharged rapidly. The battery voltage will also reduce when the battery is approaching the discharged state. Fuel cell behaviour is determined by its current-voltage characteristics (i.e. polarization curve). In general, the higher the current supplied by the fuel cell, the lower the voltage that the current is supplied at, and the higher the output power. In general, fuel cells are rather weak voltage sources, and the current output is limited by the fuel flow. Hence, the common solution is to use the battery primarily to supply current to the load as it is provided at a stable output voltage, whereas the fuel cell fulfils a secondary role in charging the battery.

Another hybrid power source is described by Jiang et al. in "A Compact Digitally Controlled Fuel Cell/Battery Hybrid Source", IEEE Transactions on Industrial Electronics, Vol. 53, No. 4, pp 1094-1104, available from the Institute of Electrical and Electronics Engineers, of Piscataway, N.J., USA. The hybrid power source comprises a proton exchange membrane (PEM) fuel cell stack, a battery, a Buck converter and a digital power controller. In this system, a battery is connected directly to the load, and the fuel cell is connected to the load through the Buck converter that regulates the voltage provided by the fuel cell by pulse width modulation. The battery is used to provide additional current when the load is drawing large currents, and is charged by the fuel cell when the load requirements are low. The digital power controller operates the Buck converter according to a control algorithm that uses values for fuel cell current limit (FCCL), the battery current limit (BCL), and the battery voltage limit (BVL) to avoid excess current or voltage causing damage to either the fuel cell or battery.

U.S. Pat. No. 6,590,370 relates to charging lithium-ion batteries from a direct oxidation fuel cell, such as from a direct methanol fuel cell. A DC-DC converter controls the operating point of the fuel cell to provide efficient transfer of power from the fuel cell to the battery. The output voltage of the converter equals the battery voltage and the converter behaves as an unregulated current source whose output charges the battery. Additionally, current may be supplied to the load.

Neither of the above described documents are optimised for maximising battery life. This issue is particularly pertinent to hybrid power sources that do not recharge the battery. In addition, prolonged battery life is also important when the power source is used in a mobile environment such as a vehicle.

SUMMARY

An embodiment of the present invention provides a hybrid electrical power supply for supplying current to a load connected to an output of the power supply, the power supply comprising: first and second electrical energy sources configured to supply current to the output; a voltage regulator electrically coupled to one of the first or second electrical energy sources and configured to regulate the voltage provided by the one of the first or second electrical energy sources; and a controller. The controller is configured to receive a signal indicative of the current being drawn at the output, to compare the output current with a reference current level, and to use the voltage regulator to regulate the voltage provided by the one of the first or second electrical energy sources such that: when the output current is lower than or equal to the reference current level, the first energy source supplies current equal to the output current; and, when the output current exceeds the reference current level, the first energy source supplies current equal to the reference current level and the second energy source supplies the remaining current required by the load.

Hence, a hybrid electrical power supply is realised that maximises use of one electrical energy source and minimises use of another electrical energy source. This may be achieved by identifying a reference current level associated with the first energy source. For example, this reference current level may be the maximum current available from the first energy source. This may correspond to the absolute maximum obtainable from the first energy source or it may correspond to a limit imposed on the first energy source (e.g. a limit set a little below the maximum obtainable to protect the first energy source).

Either way, the current drawn at the output, e.g. by a load connected across the output, is monitored and compared to the reference current level. Where the output current is less than the reference current level, then the first energy source may be used to supply substantially all this current such that the second energy source may contribute substantially nothing. This is achieved by using the voltage regulator to regulate the voltage supplied by either the first or second energy source. Setting the voltage provided by one energy source relative to the other determines the relative current contributions they will make to the output current. If, on the other hand, the output current exceeds the reference current level, the first energy source is used to its full extent by using the voltage regulator to set the voltage such that the first energy source provides current at the reference current level. The shortfall in current drawn by the output is then provided by the second energy source. In this way, the second energy source provides a minimum contribution to the current drawn by a load connected across the output.

Optionally, the first energy source is a fuel cell and the second energy source may be a battery. With this combination, the fuel cell is used in preference to the battery. As a result, the battery is used only minimally and so its life is prolonged. This is particularly advantageous where the fuel cell is not used to recharge the battery. Of course, this advantage is realised in any system where the first energy source is not used to provide energy to the second energy source. Thus, one or more embodiments of the present invention may relate to a hybrid electrical power supply where the first electrical energy source is not configured to supply energy to the second electrical energy source.

Embodiments of the present invention are contemplated in which the voltage regulator is connected to the first energy source and in which the voltage regulator is connected to the second energy source. The voltage regulator may be connected in either a parallel or a series arrangement.

Embodiments of the present invention also extend to an electrical apparatus comprising: any of the hybrid electrical power supplies described above, and a current monitor configured to monitor the current drawn at the output and to supply the signal indicative of the output current to the controller. A load may be connected across the output, in which case the current monitor may be configured to monitor the current drawn by the load.

Embodiments of the present invention also extend to a vehicle comprising any of the hybrid electrical power supplies or electrical apparatuses described above, including air vehicles, sea vehicles and land vehicles, e.g. unmanned air vehicles, airplanes, buses, coaches, lorries and automobiles.

Embodiments of the present invention also extend to a method of supplying electrical energy from a hybrid electrical power system comprising a first and second electrical energy sources connected in parallel to a load, the method comprising: determining the current being drawn by the load; comparing the load current to a reference current level; and regulating the voltage provided by either the first electrical energy source or the second electrical energy source thereby adjusting the balance of the load current supplied between the first and second electrical energy sources such that: when the load current is lower than or equal to the reference current level, the first energy source supplies substantially all the load current; and, when the load current exceeds the reference current level, the first energy source supplies current equal to the reference current level and the second energy source supplies the remaining current required by the load. The first energy source may be a fuel cell and, optionally, the second energy source may be a battery.

BRIEF DESCRIPTION OF THE DRAWINGS

Embodiments of the present invention, along with aspects of the prior art, will now be described with reference to the accompanying drawings, of which.

DETAILED DESCRIPTION

Figure 1:
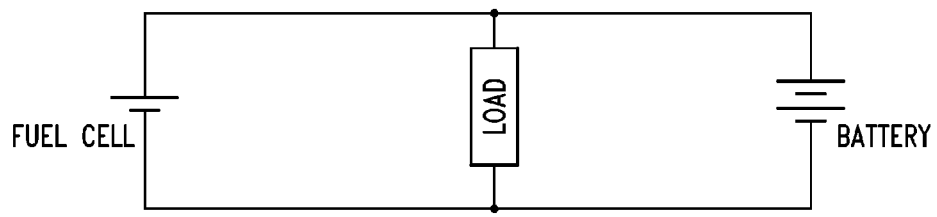
FIG. 1 shows a circuit diagram of a hybrid electrical power system of the prior art comprising a battery and fuel cell connected to a load.
Figure 2:
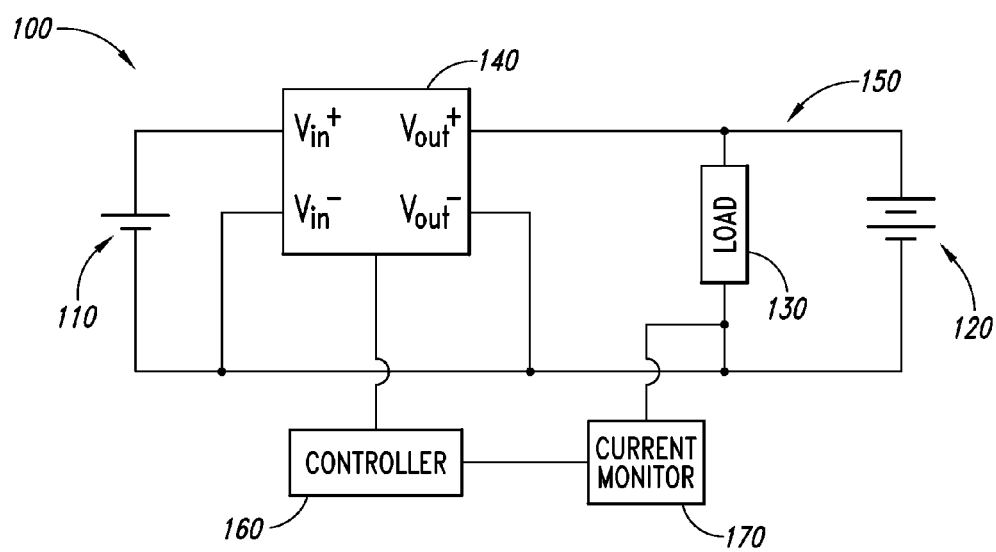
FIG. 2 shows a circuit diagram of a hybrid electrical power system of a first embodiment.

FIG. 2 shows a hybrid electrical energy system 100 may include two energy sources 110, 120 connected in parallel across a load 130 and one or more of the components described as follows. System 100 may alternatively be denoted as a hybrid electrical power supply. In this embodiment, the energy source labelled 110 comprises a fuel cell 110 and energy source labelled 120 comprises a battery. Other arrangements are possible, as will be evident from the foregoing description. The fuel cell 110 and battery 120 supply the current drawn by the load 130 through a bus 150. A voltage converter 140 sits between the fuel cell 110 and the load 130, and operates to control the potential placed on the bus 150 from the fuel cell half of the circuit. The voltage converter 140 is used to control this potential relative to the substantially constant potential provided by the battery 120. This is done in such a way that the current drawn by the load 130 is primarily supplied by the fuel cell 110 in preference to the battery 120, as will be explained in more detail below.

Figure 3:
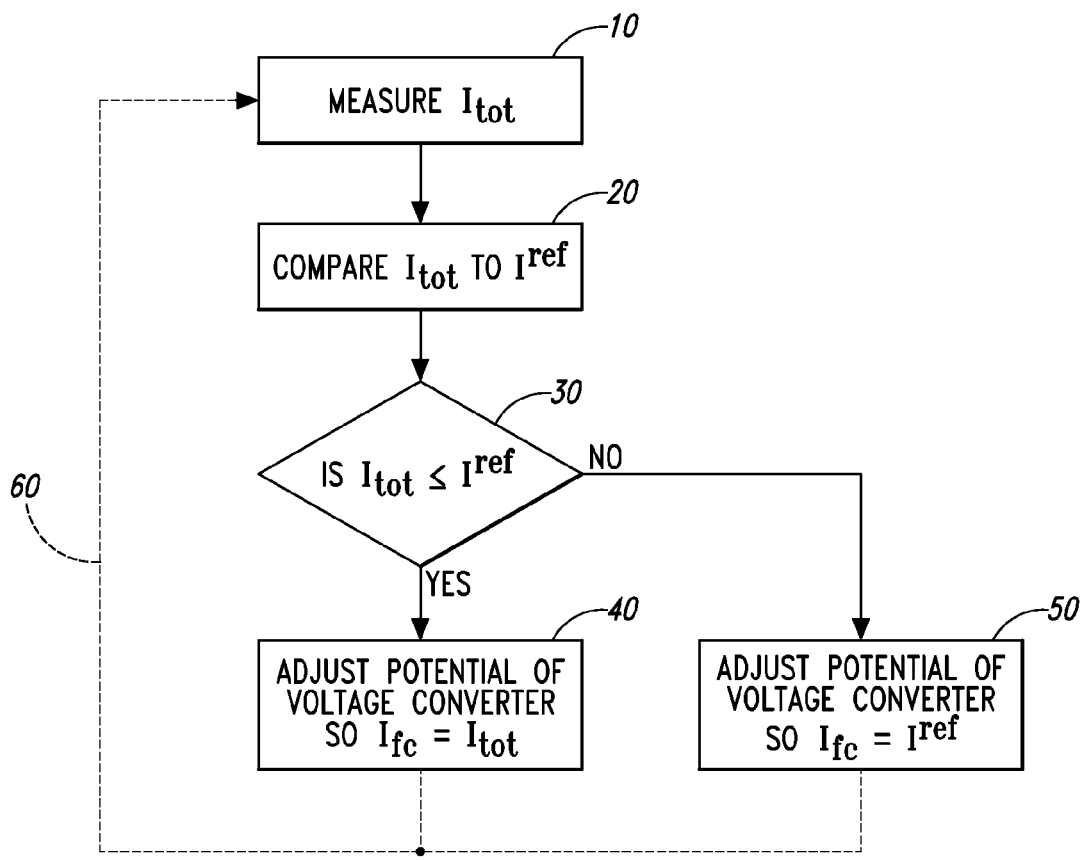
FIG. 3 is a schematic representation of a method of operating the hybrid electrical power source of FIG. 2.

In general, voltage converters have four terminals: the terms Vout+ and Vout− are used to indicate the positive (high) and negative (low) output terminals respectively, and Vin+ and Vin− are used to indicate the corresponding input terminals. The voltage between Vout+ and Vout− may be used to regulate current flow along the bus 150 under the management of a controller 160. The controller 160 receives a signal from a current monitor 170 indicative of the total current $I_{tot}$ drawn by the load 130. This current $I_{tot}$ may be supplied partly from the fuel cell ($I_{fc}$) and partly from the battery ($I_b$). FIG. 3 shows a method of operating the hybrid electrical power supply 100, and this step of determining the current drawn by the load 130 is shown at 10.

At 20, the controller 160 compares $I_{tot}$ to a reference current level $I^{ref}$. In this embodiment, $I^{ref}$ is the maximum current that the fuel cell 110 is able to supply to the load 130. In alternative embodiments, the reference current level $I^{ref}$ could be offset from the maximum to prevent damage to the fuel cell 110.

The result of the comparison between the level of current supplied to the load 130 and the reference current level $I^{ref}$ has two outcomes as indicated at 30 in FIG. 3.

If the controller 160 determines that the total current $I_{tot}$ drawn by the load is less than or equal to the reference current $I^{ref}$, then at 40 the controller 160 sets the output voltage of the voltage converter 140 to a relatively low level. This results in the bus voltage also being at a low level. The level of the voltage is set such that the current $I_{fc}$ supplied by the fuel cell 110 is substantially equal to the current drawn by the load $I_{tot}$. As a result, substantially no current is drawn from the battery 120. As will be appreciated by those skilled in the art, the actual calculation of the voltage required to ensure no current is drawn form the battery 120 is routine.

Figure 4:
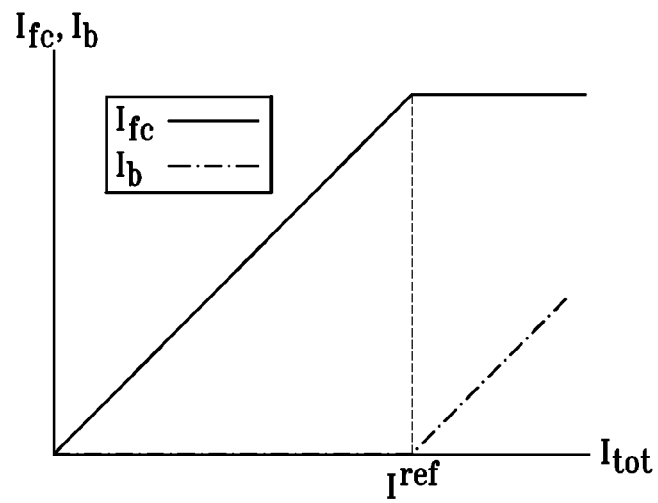
FIG. 4 shows a graph illustrating the amount of current supplied to the load from each of a battery and a fuel cell.

If the controller 160 determines that the total current $I_{tot}$ supplied to the load 130 is greater than the reference current level $I^{ref}$, then at 50 the controller 160 sets the output voltage of the voltage converter 140 to a relatively high level (greater than voltage A of FIG. 4). This level is chosen such that the fuel cell 110 supplies its maximum current, i.e. $I_{fc}=I^{ref}$. As this is not enough to satisfy the load 130, the load 130 draws the remainder of the current ($I_b=I_{tot}-I^{ref}$) from the battery 120.

The variation of $I_{fc}$ and $I_b$ with $I_{tot}$ is illustrated in FIG. 4. As can be seen, $I_b$ substantially equals zero until $I_{tot}>I^{ref}$, at which point $I_b$ increases linearly. $I_{fc}$ increases linearly from zero until it reaches its maximum value $I^{ref}$.

As indicated at 60 in FIG. 3, the process is repeated periodically such that the current monitor 170 and controller 160 periodically act to determine the current drawn by the load 130, to compare it against $I^{ref}$, and to adjust voltage provided by the voltage converter 140 accordingly.

Figure 5:
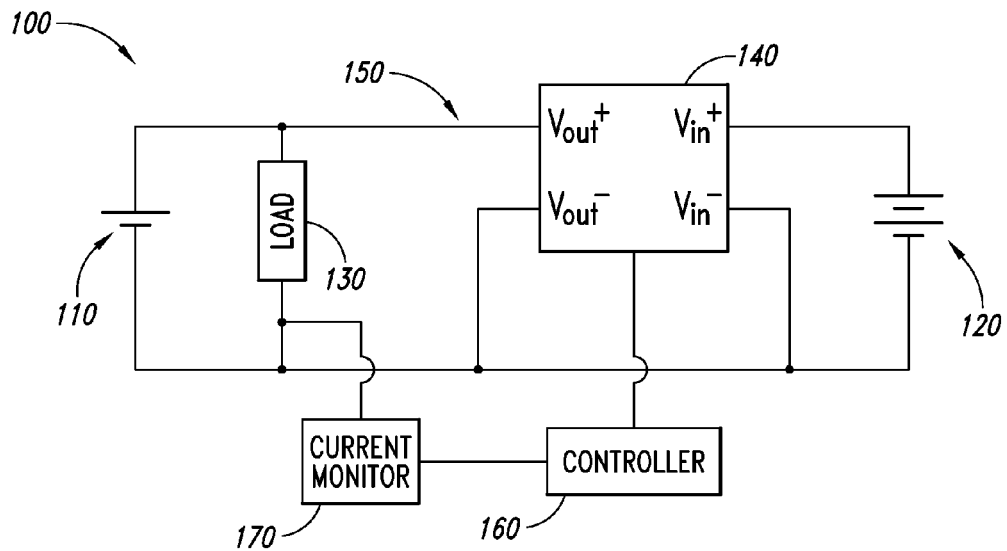
FIG. 5 shows a circuit diagram of a hybrid electrical power system of a second embodiment.

The above embodiment makes use of the voltage converter 140 to set an output voltage on the fuel cell side of the circuit relative to the voltage provided by the battery 120, thereby controlling how supply of the current $I_{tot}$ to the load 130 is shared between the fuel cell $I_{fc}$ and the battery $I_b$. Of course, this can be performed equally well with the voltage converter 140 placed on the battery side of the circuit, as shown in FIG. 5. Here, the voltage converter 140 is connected between the battery 120 and the load 130. Specifically, the Vin+ and Vin− inputs of the voltage converter 140 are connected across the two terminals of the battery 120, and the Vout+ and Vout− outputs are connected across the load 130. As will be clear, this functions in essentially the same way as the embodiment of FIG. 2: this time, the voltage converter 140 is used to set a voltage relative to the voltage provided by the fuel cell 110. Again, this determines how the current supply to the load 130 is shared between the fuel cell 110 and the battery 120, the objective once more being to minimise the contribution from the battery 120. The voltage is set in the same way as shown in FIG. 3, i.e. if $I_{tot} \leq I^{ref}$, then the voltage is set such that $I_{fc}=I_{tot}$, otherwise the voltage is set such that $I_{fc}=I^{ref}$.

Figure 6:
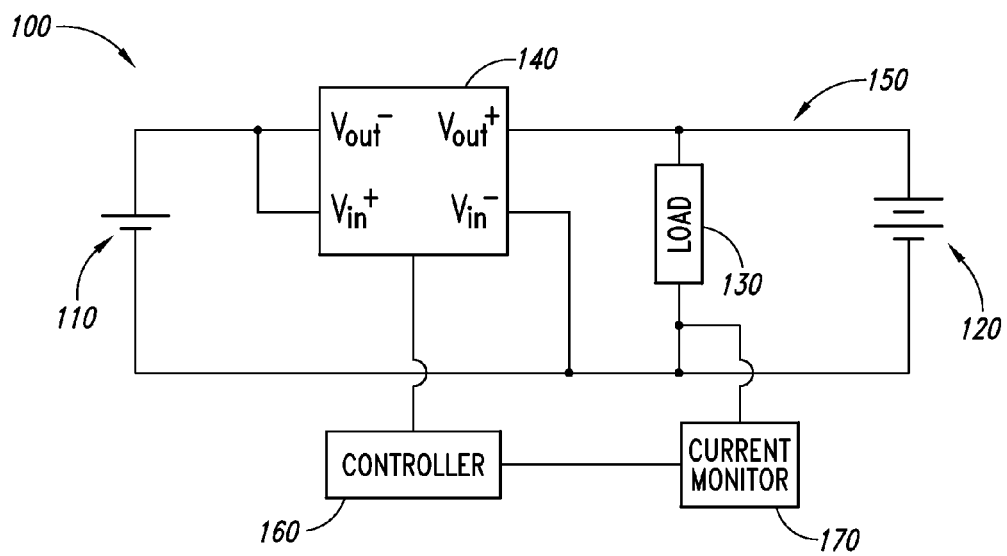
FIG. 6 shows a circuit diagram of a hybrid electrical power system of a third embodiment.
Figure 7:
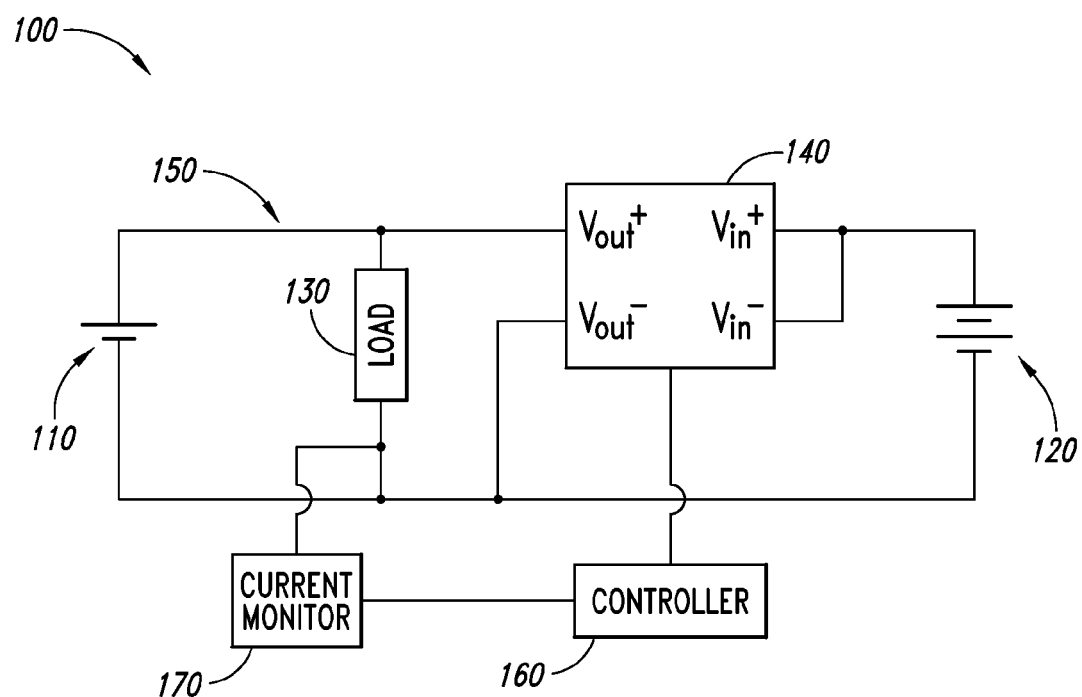
FIG. 7 shows a circuit diagram of a hybrid electrical power system of a fourth embodiment.

The embodiments of FIGS. 2 and 5 show the voltage converter 140 connected in parallel with the fuel cell 110 and the battery 120 respectively. In another embodiment, illustrated in FIG. 6, the voltage converter 140 is electrically connected in series with the fuel cell 110. That is the low input (Vin−) and high output (Vout+) are connected across the load 130, and the high input (Vin+) and low output (Vout−) are both connected to the fuel cell 110. FIG. 6 shows a similar arrangement with the voltage converter 140 electrically connected in series with the battery 120. That is, the low input (Vin−) and high output (Vout+) are connected across the load 130, and the high input (Vin+) and low output (Vout−) are both connected to the battery 120.

The above embodiments have general utility. For example, the hybrid electrical power system may be used to power vehicles such as automobiles or aircraft (e.g. UAVs). In this manner, embodiments of the present invention include portable apparatus applications.

As will be appreciated by the person skilled in the art, modifications may be made to the above embodiments without departing from the scope of the invention as defined by the appended claims.

As noted above, embodiments of the present invention are not limited to a hybrid electrical power system comprising a fuel cell 110 and battery 120, but encompass other hybrid electrical power systems. For example, a hybrid electrical power system may comprise any combination of electrical energy sources such as capacitors (e.g. fuel cell/ultra capacitor vehicles), engine driven generators, solar cells, wind turbines and tidal generators. In particular, the above embodiments are not envisaged to operate to recharge the battery 120. Thus, the battery 120 will have a finite life and will eventually need replacing. As such, it is advantageous that the battery 120 be used as little as possible in order to prolong its life.

The fuel cell 110 and battery 120 may be chosen from any one of a number of designs. For example, the fuel cell 110 may be proton exchange membrane (PEM) fuel cell, a phosphoric acid fuel cell (PAFC), a solid-oxide fuel cell (SOFC), a molten carbonate fuel cell (MCFC), or any other suitable type. The battery may be a lithium-ion or any other suitable type. The voltage converter may include a synchronous Buck converter, a step down Buck converter, a boost step-up converter, a Buck boost converter, or any other suitable voltage converter such as the LM140 voltage regulator chip supplied by National Semiconductor.

The invention claimed is:

1. A hybrid electrical power supply (100) for supplying current to a load connected to an output of the power supply, the power supply comprising:
   first and second electrical energy sources (110, 120) configured to supply current to the output wherein the first energy source (110) is a fuel cell and the second energy source (120) is a battery;
   a voltage regulator (140) electrically coupled between the output and the first or second electrical energy source configured to regulate the voltage provided to the output by regulating the voltage provided by one of the first or second electrical energy sources;
   a controller (160) configured to receive a signal indicative of the current being drawn at the output (150) and to compare the output current with a reference current level characterized in that:
   the voltage regulator (140) is configured to regulate the voltage provided to the output by regulating the voltage provided by one of the first or second electrical energy sources; the controller (160) is configured to use the voltage regulator to set the output voltage provided by the one of the first or second electrical energy sources such that:
   when the output current is lower than the reference current level the voltage regulator sets the voltage provided to the output to a first level such that the fuel cell, as the first energy source supplies current equal to the output current; and,
   when the output current exceeds the reference current level the voltage regulator sets the voltage provided in the output to a second level greater than the first such that the first energy source supplies current equal to the reference current level and the second energy source supplies the remaining current required by the load.

2. The apparatus of claim 1, wherein the reference current level is the maximum current available from the first energy source.

3. The apparatus of claim 1, wherein the voltage regulator is connected to the first energy source (110).

4. The apparatus of claim 1, wherein the voltage regulator is connected to the second energy source (120).

5. An electrical apparatus comprising:
   the hybrid electrical power supply of claim 1, and
   a current monitor (170) configured to monitor the current drawn at the output and to supply the signal indicative of the output current to the controller.

6. An electrical apparatus of claim 5, further comprising:
   the hybrid electrical power supply of claim 1, and
   a load (130) connected to the output of the hybrid electrical power supply, wherein the load draws current from the output.

7. An electrical apparatus according to claim 6, further comprising:
   a current monitor configured to monitor the current drawn by the load and to supply an output current signal to the controller.

8. A vehicle comprising the hybrid electrical power supply of claim 1.

9. An air vehicle comprising the hybrid electrical power supply of claim 1.

10. A method of supplying electrical energy from a hybrid electrical power system (100) comprising a first and second electrical energy sources (110, 120) connected in parallel to a load (130), the first energy source being a fuel cell and the second energy source being a battery, and a regulator electrically coupled between the load and the first or second energy source, the method comprising:

determining (10) the current being drawn by the load;

comparing (20) the load current to a reference current level; and regulating the voltage provided to the load by either the first electrical energy source (110) or the second electrical energy source (120) and thereby adjusting the balance of the load current supplied between the first and second electrical energy sources such that: (40) when the load current is lower than or equal to the reference current level, the voltage to the load is set to a first level such that the first energy source supplies substantially all the current to the load; and, (50) when the load current exceeds the reference current level, the voltage to the load is set to a second level, greater than the first, such that the first energy source supplies current equal to the reference current level and the second energy source supplies the remaining current required by the load.

11. The method of claim 10, wherein the reference current level is the maximum current available from the first energy source (110).

12. A vehicle comprising a hybrid electrical energy system (100) and a controller (160) arranged to perform the method of claim 10.

* * * * *